(12) United States Patent
Yamaai et al.

(10) Patent No.: US 11,362,619 B2
(45) Date of Patent: Jun. 14, 2022

(54) PHOTOELECTRIC CONVERSION DEVICE

(71) Applicant: ZEON CORPORATION, Tokyo (JP)

(72) Inventors: Midori Yamaai, Tokyo (JP); Kiyoshige Kojima, Tokyo (JP); Yuki Hayashi, Tokyo (JP); Masayoshi Yoshida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 230 days.

(21) Appl. No.: 15/574,491

(22) PCT Filed: May 24, 2016

(86) PCT No.: PCT/JP2016/002514
§ 371 (c)(1),
(2) Date: Nov. 16, 2017

(87) PCT Pub. No.: WO2016/189861
PCT Pub. Date: Dec. 1, 2016

(65) Prior Publication Data
US 2018/0131318 A1 May 10, 2018

(30) Foreign Application Priority Data
May 28, 2015 (JP) .............................. JP2015-108936

(51) Int. Cl.
*H02S 40/34* (2014.01)
*H02S 30/20* (2014.01)

(52) U.S. Cl.
CPC .............. *H02S 40/34* (2014.12); *H02S 30/20* (2014.12)

(58) Field of Classification Search
CPC ................................ H02S 40/34; H02S 30/20
(Continued)

(56) References Cited

U.S. PATENT DOCUMENTS 5,433,259 A * 7/1995 Faludy ................... B60P 3/343
136/245
6,066,796 A * 5/2000 Itoyama ............ H01L 31/02008
136/251
(Continued)

FOREIGN PATENT DOCUMENTS

CN 1633716 A 6/2005
CN 102301493 A 12/2011
(Continued)

OTHER PUBLICATIONS

Nov. 28, 2017, International Preliminary Report on Patentability issued in the International Patent Application No. PCT/JP2016/002514.

(Continued)

*Primary Examiner* — Eli S Mekhlin
(74) *Attorney, Agent, or Firm* — Kenja IP Law PC

(57) ABSTRACT

Disclosed is a photoelectric conversion device that includes: a thin panel-shaped photoelectric conversion module; a first connection member that couples to an outer edge of the photoelectric conversion module at a joint so as to be electrically connected to the photoelectric conversion module; a reinforcing member that couples to a portion including the joint; and a main body that receives electric power supply from the photoelectric conversion module via the first connection member. The first connection member is mechanically and electrically attachable/detachable to/from the main body and has a thickness in vertical direction that is greater than a thickness in vertical direction of the photoelectric conversion module and less than or equal to a thickness in vertical direction of the reinforcing member at the joint.

11 Claims, 7 Drawing Sheets

(58) Field of Classification Search
USPC .................................................. 136/243–265
See application file for complete search history.

(56) References Cited

U.S. PATENT DOCUMENTS

| | | | | |
|---|---|---|---|---|
| 6,337,436 | B1* | 1/2002 | Ganz | ................ H02S 40/34 |
| | | | | 136/251 |
| 2002/0078991 | A1* | 6/2002 | Nagao | ................ F24S 25/61 |
| | | | | 136/251 |
| 2005/0116143 | A1 | 6/2005 | Watanabe et al. | |
| 2006/0243318 | A1* | 11/2006 | Feldmeier | ............ H02S 40/34 |
| | | | | 136/244 |
| 2010/0108120 | A1 | 5/2010 | Lin et al. | |
| 2010/0258157 | A1* | 10/2010 | Arai | ................ H01R 13/52 |
| | | | | 136/244 |
| 2012/0031455 | A1* | 2/2012 | Yokoyama | ........ H01L 31/02013 |
| | | | | 136/244 |
| 2013/0284234 | A1* | 10/2013 | Funayama | ............ H02S 30/20 |
| | | | | 136/245 |

FOREIGN PATENT DOCUMENTS

| | | |
|---|---|---|
| EP | 1475842 A1 | 11/2004 |
| EP | 2410573 A1 | 1/2012 |
| JP | S51132972 U1 | 10/1976 |
| JP | H069156 U | 2/1994 |
| JP | 3091637 U | 2/2003 |
| JP | 2006024777 A | 1/2006 |
| WO | 2010106799 A1 | 9/2010 |

OTHER PUBLICATIONS

Aug. 9, 2016, International Search Report issued in the International Patent Application No. PCT/JP2016/002514.

Japanese Patent Application No. 2015-059752 filed on Mar. 23, 2011, in the name of Zeon Corporation, entitled "Photoelectric Conversion Device".

Nov. 28, 2018, the Extended European Search Report issued by the European Patent Office in the corresponding European Patent Application No. 16799574.5.

* cited by examiner

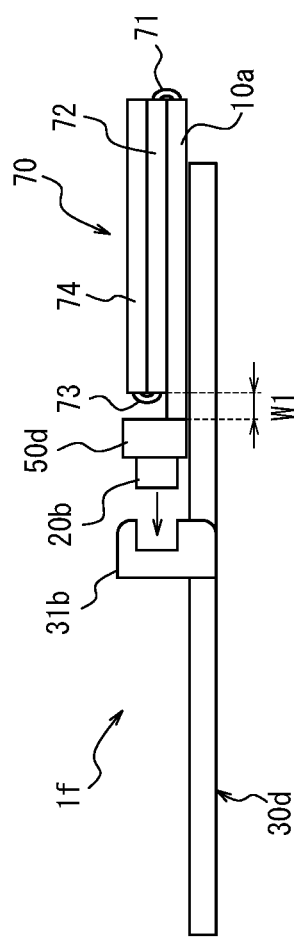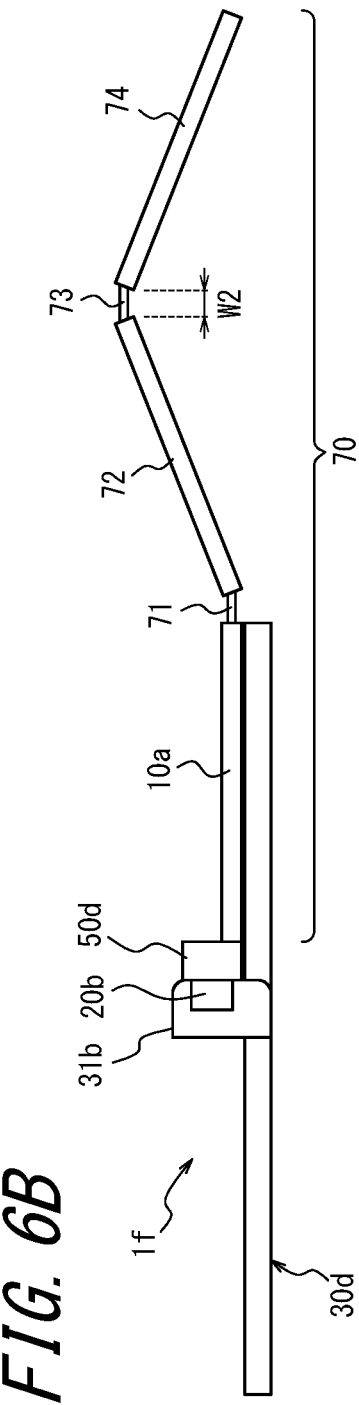

PHOTOELECTRIC CONVERSION DEVICE

TECHNICAL FIELD

This disclosure relates to photoelectric conversion devices.

BACKGROUND

Photoelectric conversion devices such as portable solar charging devices have been known that are configured to store electric power generated by a photoelectric conversion module of solar cells or other elements or supply the electric power to an external device. As one of such photoelectric conversion devices, for example, Patent Literature 1 discloses a portable solar charging device with a rectangular panel in which solar cells are stacked within a rectangular frame. With the configuration disclosed in Patent Literature 1, the stacked solar cells can be protected from external impact as they are mounted within the frame.

CITATION LIST

Patent Literature

PTL 1: JPH06009156U

SUMMARY

Technical Problem

In recent years, as a plate-shaped thin photoelectric conversion module, for example, a thin panel-shaped photoelectric conversion module, such as an organic thin-film solar cell module fabricated on a plastic film or other substrate, has become widespread. However, coupling of a connection member, such as a connector attachable/detachable to/from a battery or other device, to such a thin panel-shaped photoelectric conversion module has met with difficulty because the module is thinner than the connection member.

It is therefore an object of this disclosure to provide a photoelectric conversion device wherein a connection member can be reliably coupled to a thin panel-shaped photoelectric conversion module.

This disclosure aims to advantageously solve the problem set forth above, and the presently disclosed photoelectric conversion device comprises a thin panel-shaped photoelectric conversion module; a first connection member that couples to an outer edge of the photoelectric conversion module at a joint so as to be electrically connected to the photoelectric conversion module; a reinforcing member that couples to a portion including the joint; and a main body that receives electric power supply from the photoelectric conversion module via the first connection member. The first connection member is mechanically and electrically attachable/detachable to/from the main body and has a thickness in vertical direction that is greater than a thickness in vertical direction of the photoelectric conversion module and less than or equal to a thickness in vertical direction of the reinforcing member at the joint. With such a configuration, it is possible to obtain a photoelectric conversion device wherein the first connection member can be reliably coupled to the thin panel-shaped photoelectric conversion module.

In the presently disclosed photoelectric conversion device, it is preferred that the photoelectric conversion module can be housed in rolled form, and the reinforcing member has a thickness in vertical direction that is greater than or equal to a thickness in vertical direction of the photoelectric conversion module in rolled form. With such a configuration, even when the photoelectric conversion module is housed in rolled form, it is possible to protect the rolled photoelectric conversion module.

In the presently disclosed photoelectric conversion device, it is preferred that the photoelectric conversion module is included in a photoelectric conversion module group in which a plurality of thin panel-shaped photoelectric conversion modules are coupled to one another, the photoelectric conversion module group is foldable in vertical direction with adjacent photoelectric conversion modules being stacked on top of each other, and the reinforcing member has a thickness in vertical direction that is greater than or equal to a thickness in vertical direction of the photoelectric conversion module group in folded form. With such a configuration, even when a photoelectric conversion module group in which a plurality of photoelectric conversion modules are connected to one another is included, it is possible to protect the folded photoelectric conversion module group.

In the presently disclosed photoelectric conversion device, it is preferred that in the photoelectric conversion module group, the photoelectric conversion module that couples to the first connection member has a width that is greater than a width of any one of other photoelectric conversion modules by at least half a distance between adjacent photoelectric conversion modules, as measured in a direction in which the photoelectric conversion modules are coupled. With such a configuration, when the photoelectric conversion module group is folded, it is possible to prevent the bent coupling section between the photoelectric conversion modules from contacting the reinforcing member.

In the presently disclosed photoelectric conversion device, it is preferred that the photoelectric conversion module is included in a photoelectric conversion module group in which a plurality of thin panel-shaped photoelectric conversion modules are coupled to one another, the photoelectric conversion module group can be housed in rolled form, and the reinforcing member has a thickness in vertical direction that is greater than or equal to a thickness in vertical direction of the photoelectric conversion module group in rolled form. With such a configuration, even when the photoelectric conversion module group is housed in rolled form, it is possible to protect the rolled photoelectric conversion module group.

In the presently disclosed photoelectric conversion device, it is preferred that the main body comprises a second connection member capable of supplying electric power to an external device. With such a configuration, electric power from the photoelectric conversion module can be supplied to an external device via the main body.

In the presently disclosed photoelectric conversion device, it is preferred that the second connection member is a USB connector.

In the presently disclosed photoelectric conversion device, it is preferred that the second connection member is a cable having a connector at a tip thereof.

In the presently disclosed photoelectric conversion device, it is preferred that the first connection member is a card edge connector.

In the presently disclosed photoelectric conversion device, it is preferred that the first connection member has a connection mechanism composed of a guide and a connector.

It is preferred that the presently disclosed photoelectric conversion device further comprises a third connection member provided on the reinforcing member or the main body, the third connection member being capable of mechanically attaching/detaching the reinforcing member or the photoelectric conversion module to/from the main body. When the photoelectric conversion device further comprises such a third connection member, it is possible to enhance the integrity between the main body and the photoelectric conversion module in a state where the first connection member is attached to the main body.

Advantageous Effect

According to this disclosure, it is possible to provide a photoelectric conversion device wherein a connection member can be reliably coupled to a thin panel-shaped photoelectric conversion module.

Further, the first connection means described in this disclosure engages with second connection means described in Japanese Patent Application No. 2015-059752 separately filed by the present inventors and therefore is compatible connection means. Accordingly, this disclosure can directly enjoy the benefits of the separate application.

BRIEF DESCRIPTION OF THE DRAWINGS

In the accompanying drawings:

FIGS. 6A and 6B are cross-sectional views of folded and unfolded states, respectively, of Modified Example 2 of the photoelectric conversion device shown in FIG. 1;

DETAILED DESCRIPTION

An embodiment of this disclosure will be described below, which however shall not be construed as limiting the scope of this disclosure in any way.

Figure 2A:
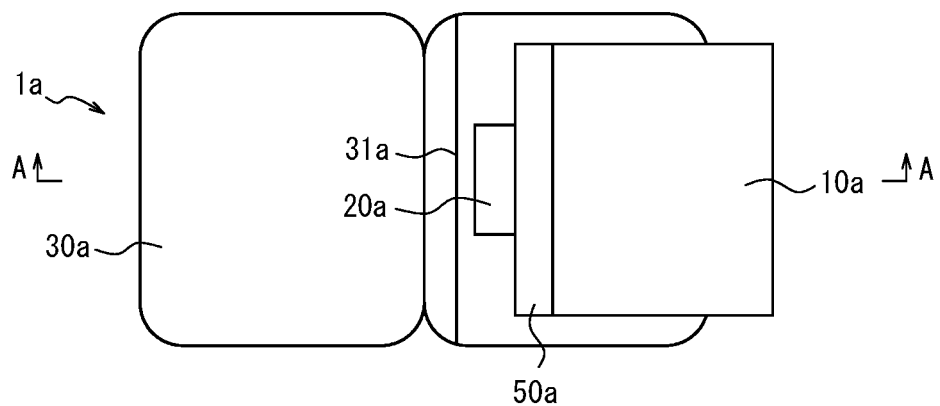
FIGS. 2A and 2B are a top view and a cross-sectional view, respectively, of the photoelectric conversion device shown in FIG. 1.

As used herein, "vertical direction" means a direction perpendicular to the plane of the paper of a top view of a photoelectric conversion device, such as FIG. 2A, with the upper direction meaning a direction pointing toward the reader from the plane of the drawing and the lower direction meaning a direction opposite to the upper direction.

First Embodiment

Figure 1:
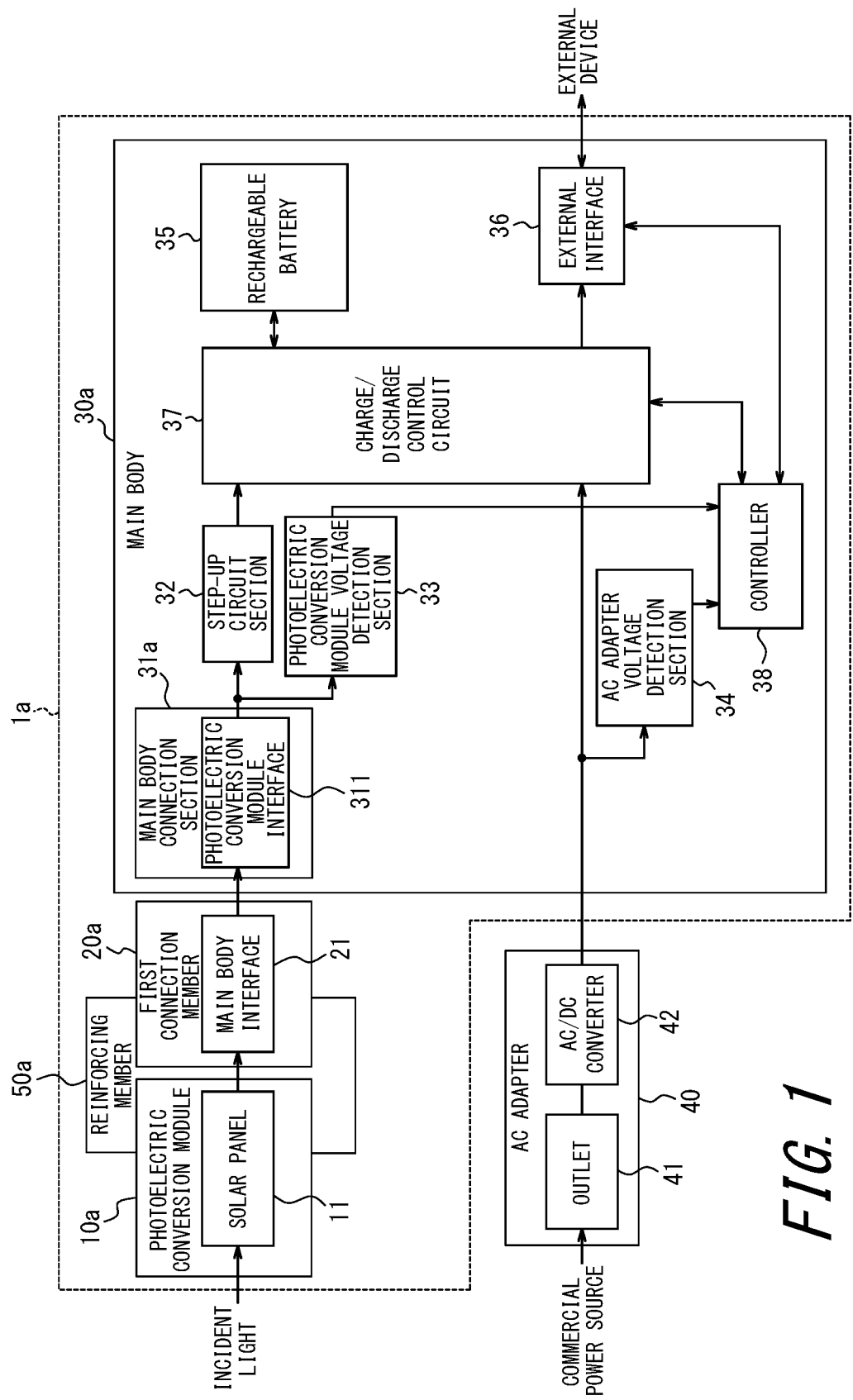
FIG. 1 is a block diagram showing a configuration of a photoelectric conversion device according to an embodiment of this disclosure.

Referring to FIGS. 1 to 9, a photoelectric conversion device according to an embodiment of this disclosure will be described in detail by way of example. FIG. 1 is a block diagram showing a configuration of photoelectric conversion device 1a according to an embodiment of this disclosure.

Photoelectric conversion device 1a according to the present embodiment comprises thin panel-shaped photoelectric conversion module 10a, first connection member 20a, main body 30a, and reinforcing member 50a. Photoelectric conversion device 1a can receive electric power supply from a commercial power source via AC adapter 40. AC adapter 40 comprises outlet 41 and AC/DC converter 42. AC voltage is input from the commercial power source to AC/DC converter 42 via outlet 41, and AC/DC converter 42 converts the input AC voltage into DC voltage and supplies it to main body 30a.

Photoelectric conversion module 10a comprises solar panel 11. Solar cell panel 11 is a panel member including solar cells that photoelectrically convert incident light such as sunlight, room light, etc., and output electric power. Photoelectric conversion module 10a further comprises a substrate (not shown) for supporting solar panel 11, lead-out wire 12 for extracting power generated by solar panel 11, and so forth (see FIG. 3).

Types of solar cells constituting solar panel 11 are roughly classified into inorganic solar cells in which an inorganic material is used and organic solar cells in which an organic material is used. Examples of inorganic solar cells include silicon (Si) solar cells in which silicon is used and compound solar cells in which a compound is used. Examples of organic solar cells include thin-film solar cells such as low-molecular weight vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. Solar cells constituting solar panel 11 can also include organic/inorganic hybrid solar cells and solar cells in which a perovskite compound is used. In this disclosure, thin panel-shaped solar cell panel 11 is used, with dye-sensitized solar cells formed on plastic film or other substrate being suitable. Note that thin panel-shaped solar cell panel 11 is not limited to one fabricated on plastic film or other substrate; any mode is applicable as long as it is similarly thin.

First connection member 20a is electrically connected to photoelectric conversion module 10a. First connection member 20a comprises main body interface (IF) 21. The electric power generated by solar panel 11 is supplied via main body interface 21 to photoelectric conversion module interface (IF) 311 provided in main body connection section 31a of main body 30a. As will be described in detail later, first connection member 20a couples to an outer edge of photoelectric conversion module 10a and is attachable/detachable to/from main body 30a mechanically and electrically.

Main body 30a comprises a circuit board (not shown) and comprises, on the circuit board, main body connection section 31a, step-up circuit section 32, photoelectric conversion module voltage detection section 33, AC adapter voltage detection section 34, rechargeable battery 35, external interface (IF) 36, charge/discharge control circuit 37, and controller 38.

Main body connection section 31a allows first connection member 20a to be mechanically and electrically attached/detached to/from main body 30a via main body connection section 31a, and comprises photoelectric conversion module interface 311. Photoelectric conversion module interface 311 outputs to step-up circuit section 32 a voltage supplied via substrate, lead-out wire 12 and/or main body interface 21 from solar panel 11 of photoelectric conversion module 10*a* attached to main body connection section 31*a* via first connection section 20*a*.

Step-up circuit section 32 steps up the voltage supplied from photoelectric conversion module interface 311 to a predetermined level necessary for charging rechargeable battery 35, and outputs the voltage to charge/discharge control circuit 37.

Photoelectric conversion module voltage detection section 33 detects a voltage (photoelectric conversion module voltage) supplied to step-up circuit section 32 via photoelectric conversion module interface 311 from solar panel 11 of photoelectric conversion module 10*a* attached to main body connection section 31*a* of main body 30*a*, and outputs the detection result to controller 38.

AC adapter voltage detection section 34 detects a voltage (AC adapter voltage) supplied from AC adapter 40 to charge/discharge control circuit 37, and outputs the detection result to controller 38.

Rechargeable battery 35 is a chargeable/dischargeable battery such as a lead storage battery or a lithium ion secondary battery.

External interface (IF) (second connection member) 36 can connect an external device to supply electric power to the connected external device. Second connection member 36 is not particularly limited and may be a universal serial bus (USB) connector using a USB interface, a cable having a connector at its tip, or the like, and is connected to an external device to supply electric power to the external device for example upon receipt of a charging request from the external device. Photoelectric conversion module 10*a* can be mechanically and electrically attached/detached to/from mobile phones, smart phones, tablet devices, personal computers or other devices to be charged, via second connection member 36.

Charge/discharge control circuit 37 controls charging and discharging between step-up circuit section 32, AC adapter 40, rechargeable battery 35, and an external device connected via external IF 36.

Controller 38 controls the operation of each section of main body 30. For example, controller 38 controls charge/discharge control circuit 37 to control paths for charging and discharging, based on the detection result of photoelectric conversion module voltage detection section 33, the detection result of AC adapter voltage detection section 34, and the charge level of rechargeable battery 35. Controller 38 also controls, for example, the step up operation of step-up circuit section 32.

Reinforcing member 50*a* is for physically reinforcing first connection member 20*a* and photoelectric conversion module 10*a*. Details of reinforcing member 50*a* are described later.

Figure 2B:
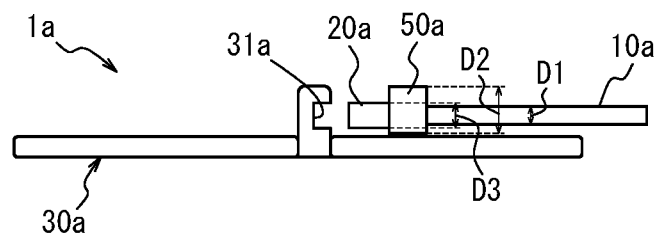
Figure 3:
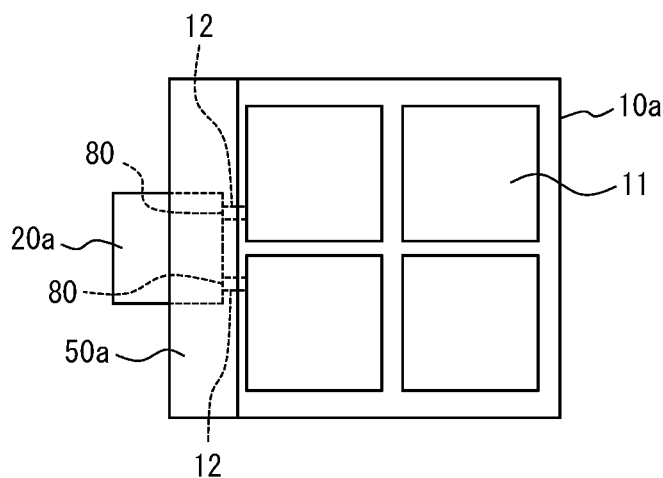
FIG. 3 is a top view showing a configuration of the photoelectric conversion device shown in FIG. 1 other than a main body, with a reinforcing member and a substrate shown transparent.

FIG. 2A is a top view of photoelectric conversion device 1*a*, and FIG. 2B is a cross-sectional view of FIG. 2A taken along line A-A. Note that FIG. 2A depicts photoelectric conversion device 1*a* without solar panel 11 and this applies to FIGS. 4A to 5B, and 8. FIG. 3 is a top view showing a configuration of photoelectric conversion device 1*a* other than main body 30*a*, with reinforcing member 50*a* and a substrate of photoelectric conversion module 10 shown transparent.

Photoelectric conversion module 10*a* in photoelectric conversion device 1*a* is in the form of a thin panel and its shape is not particularly limited. In addition to a rectangular shape as shown in FIG. 2A, polygonal shapes such as hexagons, circles, etc. can also be contemplated. The thickness in vertical direction of photoelectric conversion module 10*a* is the thickness between electrode substrates of the solar cell, including the thickness of the electrode substrate itself; a suitable thickness is, for example, 3 mm or less from the perspective of manufacturing techniques. A suitable lower limit of the thickness of photoelectric conversion module 10*a* is about 10 μm. It is also possible to coat photoelectric conversion module 10*a* with an exterior material for the purpose of, for example, imparting environmental resistance. Further, photoelectric conversion module 10*a* preferably has flexibility. As shown in FIG. 3, solar panel 11 for receiving incident light from above is disposed on photoelectric conversion module 10*a*. As shown in FIG. 3, photoelectric conversion module 10*a* comprises lead-out wire 12 connected to solar panel 11 and extending from the outer edge of photoelectric conversion module 10*a*. Photoelectric conversion module 10*a* allows the electric power generated by solar panel 11 to be output to the outside by means of lead-out wire 12.

Main body 30*a* may include covers as shown in FIGS. 2A and 2B in addition to the components described above. Specifically, main body 30*a* shown in FIGS. 2A and 2B may comprise covers coupled to both of lateral sides of main body connection section 31*a*. Main body 30*a* serves to protect both photoelectric conversion module 10*a* and first connection member 20*a* while photoelectric conversion module 10*a* is attached. Specifically, main body 30*a* of photoelectric conversion device 1*a* shown in FIG. 2 is in a state where the covers are opened, and photoelectric conversion module 10*a* can be attached via first connection member 20*a* to main body connection section 31*a* which is exposed with the covers of main body 30*a* opened. With photoelectric conversion module 10*a* mounted, the covers of main body 30*a* are closed so that photoelectric conversion module 10*a*, first connection member 20*a* and reinforcing member 50*a* can be sandwiched with the covers to protect them from external impact. Main body 30*a* preferably has rigidity in order to well exhibit such a protection function.

First connection member 20*a* couples to the outer edge of photoelectric conversion module 10*a* at joint 80 and is electrically connected to photoelectric conversion module 10*a*. Specifically, when photoelectric conversion module 10*a* has a rectangular shape, first connection member 20*a* couples to photoelectric conversion module 10*a* with a part of the left side of photoelectric conversion module 10*a* used as joint 80. First connection member 20*a* is configured to be mechanically and electrically attachable/detachable to/from main body 30*a* via main body connection section 31*a* of main body 30*a*. First connection member 20*a* and main body connection section 31*a* can be composed of, for example, connectors such as card edge connectors that can be repeatedly attached to and detached from each other. Note that first connection member 20*a* in FIG. 2 is shown detached from main body connection section 31*a*. By sliding this first connection member 20*a* to the left, first connection member 20*a* is inserted into and mounted to main body connection section 31*a*. This also applies to FIGS. 4A to 5B, 7A, 7B, and 9.

First connection member 20*a* may also have a connection mechanism composed of a guide and a connector. Specifically, first connection member 20*a* may have a guide and a connector provided at a tip of the guide, and main body connection section 31*a* of main body 30*a* may have a guide rail having a shape corresponding to the guide of first connection member 20*a*, and a main body connector. In this case, the guide of first connection member 20*a* is slid and inserted while being fitted to the guide rail of main body connection section 31*a*, so that the connector of the first connection member and the main body connector are connected together. This allows first connection member 20*a* and main body 30*a* to be physically connected together between the guide and guide rail as well as to be electrically connected together between the connector and main body connector.

As shown in FIG. 3, first connection member 20*a* couples to photoelectric conversion module 10*a* by being connected at the joints 80 to lead-out wires 12 extending from the outer edge of photoelectric conversion module 10*a*.

Reinforcing member 50*a* is a rigid member and, as shown in FIG. 3, is provided to cover joints 80, including a part of first connection member 20*a* on the photoelectric conversion module 10*a* side (opposite to the side to be connected with main body connection section 31*a*) and a part of photoelectric conversion module 10*a* on the first connection member 20*a* side. Because panel shaped photoelectric conversion module 10*a* is very thin and is thinner than first connection member 20*a*, coupling of first connection member 20*a* to the outer edge of photoelectric conversion module 10*a* is difficult. However, providing such reinforcing member 50 ensures coupling of first connection member 20*a* to photoelectric conversion module 10.

It is preferred that the width of reinforcing member 50*a* is greater than or equal to the width of first connection member 20*a* and less than one-third the width of the photoelectric conversion module 10*a*, as measured in the lateral direction in the top view of FIG. 2A. This configuration makes it possible to improve portability by reducing the size in the top view of photoelectric conversion device 1*a* while ensuring the ability of reinforcing member 50*a* to reinforce photoelectric conversion device 1*a*.

When photoelectric conversion device 1*a* comprises such reinforcing member 50*a*, it is also possible to reduce the stress on photoelectric conversion module 10*a* around first connection member 20*a* upon attachment/detachment of first connection member 20*a* to/from main body 30*a* and thus to prevent deflection of photoelectric conversion module 10*a*. Further, when photoelectric conversion device 1*a* comprises such reinforcing member 50*a*, it is also possible to reduce the stress on first connection member 20*a* itself, as well as on joint 80 between first connection member 20*a* and photoelectric conversion module 10*a*.

Reinforcing member 50*a* has, on its top view, a rectangular shape whose longer side extends in a direction perpendicular to the direction in which first connection member 20*a* is attached or detached and to vertical direction. As used herein, the phrase "provided to cover" means that the reinforcing member is provided to cover at least a portion in the upper direction of an object, which encompasses that the reinforcing member is provided to cover a portion in any direction of an object other than the upper direction.

The relation $D2 \geq D3 > D1$ holds when, as shown in FIG. 2B, the thickness in vertical direction of photoelectric conversion module 10*a* is defined as D1, the thickness in vertical direction of reinforcing member 50*a* at joint 80 as D2, and the thickness in vertical direction of first connection member 20*a* as D3. Specifically, first connection member 20*a* has a thickness in vertical direction that is greater than the thickness in vertical direction of photoelectric conversion module 10*a* (i.e., first connection member 20*a* is thicker than photoelectric conversion module 10*a*) and less than or equal to the thickness in vertical direction of reinforcing member 50*a* at joint 80. This configuration ensures that first connection member 20*a* is more reliably coupled to photoelectric conversion module 10*a*.

Reinforcing member 50*a* also serves as a gripping section to be gripped upon attachment/detachment of first connection member 20*a* to/from main body 30*a*. Specifically, first connection member 20*a* cannot be easily gripped because it is relatively small and is positioned too close to main body connection section 31*a*. Further, as photoelectric conversion module 10*a* has a thin panel shape and may have flexibility, when photoelectric conversion module 10*a* is gripped for attachment or detachment, photoelectric conversion module 10*a* is not stabilized and there is concern that it is broken in worst case. On the other hand, reinforcing member 50*a* is stable due to its rigidity and is also easily gripped because it is farther from main body connection section 31*a* than first connection member 20*a*. Furthermore, by gripping reinforcing member 50*a*, the stress on photoelectric conversion module 10*a* upon attachment/detachment is dispersed, so that damage to photoelectric conversion module 10*a* can be limited.

Figure 4A:
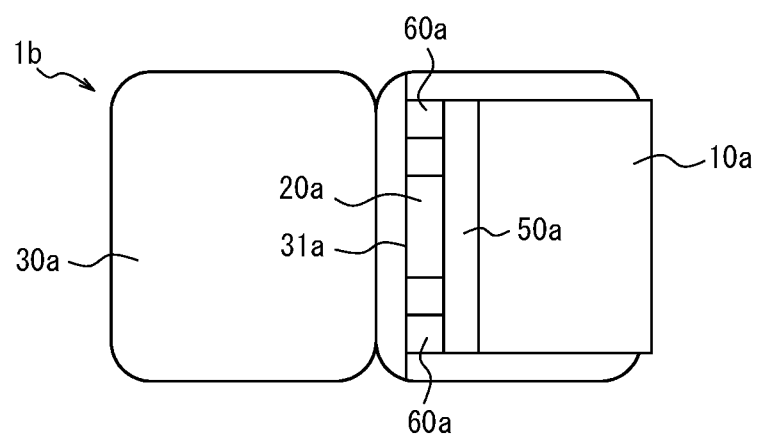
FIGS. 4A and 4B are top views of the photoelectric conversion device shown in FIG. 1 that further comprises a third connection member.
Figure 4B:
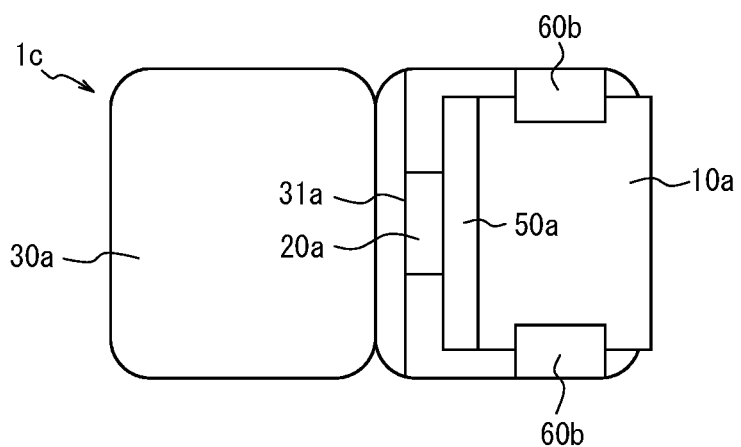

Photoelectric conversion device 1*a* may further comprise a third connection member provided on reinforcing member 50*a* or main body 30*a*, which allows photoelectric conversion module 10*a* or reinforcing member 50*a* to be mechanically attached/detached to/from main body 30*a*. For example, as shown in FIG. 4A, photoelectric conversion device 1*a* may be photoelectric conversion device 1*b* which comprises third connection member 60*a* which is provided at an end surface of reinforcing member 50*a* on the same side as first connection member 20*a* and which is attached/detached to/from main body 30*a* in conjunction with attachment/detachment of first connection member 20*a* to/from main body 30*a*. In this case, main body 30*a* may be provided with a connection portion corresponding to third connection member 60*a*. Alternatively, as shown in FIG. 4B, photoelectric conversion device 1*a* may be photoelectric conversion device 1*c* which comprises third connection member 60*b* which is provided on main body 30*a* and which allows photoelectric conversion module 10 to be sandwiched between third connection member 60*b* and the covers of main body 30*a* like a binder. Thus, with photoelectric conversion device 1*b*, 1*c* further provided with the third connection member, it is possible to increase integrity between main body 30*a* and photoelectric conversion module 10 when photoelectric conversion module 10 is attached to main body 30*a*.

First connection member 20*a*, second connection member 36 and third connection members 60*a*, 60*b* may each comprise a locking mechanism that ensures that the connection member is mechanically kept secured to a connection target. Any of the locking mechanisms known in the art is applicable, e.g., a mechanism that comprises a locking claw and a claw catch configured to be engaged with the locking claw is applicable.

Figure 5A:
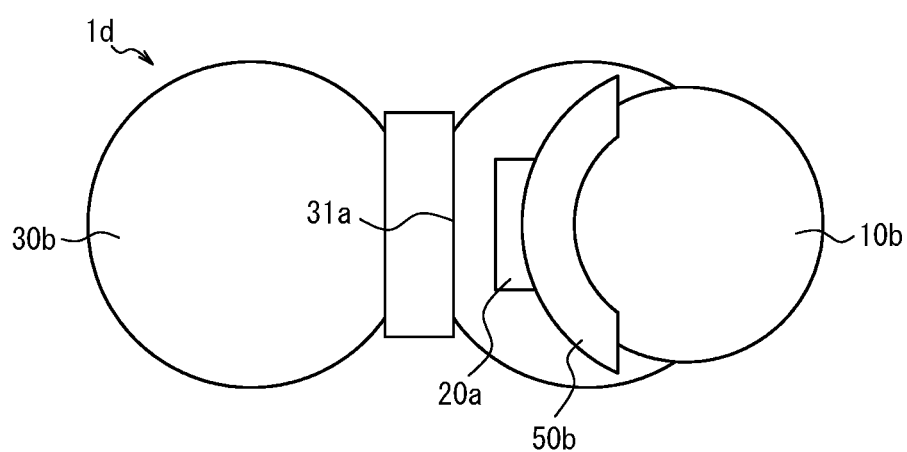
FIGS. 5A and 5B are top views of Modified Example 1 of the photoelectric conversion device shown in FIG. 1.

As Modified Example 1 of photoelectric conversion device 1*a*, as shown in FIG. 5A, photoelectric conversion device 1*a* can be photoelectric conversion device 1*d* in which rectangular photoelectric conversion module 10*a* is replaced by circular photoelectric conversion module 10*b* and main body 30*a* is replaced by main body 30*b* having arc-shaped covers conforming to the shape of photoelectric conversion module 10*b*. In this case, in place of reinforcing member 50*a*, reinforcing member 50*b* can be used that conforms to the shape of the outer edge of photoelectric conversion module 10*b* and to the shape of main body 30*b*. In these ways, the shape of photoelectric conversion device can have variations. When photoelectric conversion device 1d is used, as in the case of photoelectric conversion device 1a, the covers of main body 30b are closed with photoelectric conversion module 10b attached, so that photoelectric conversion module 10b, first connection member 20a and reinforcing member 50b can be sandwiched with the covers of main body 30b to protect them from external impact. Further, as the shape of reinforcing member 50b conforms to the shape of main body 30b, it is possible to reduce the entire size of photoelectric conversion device 1d.

Figure 5B:
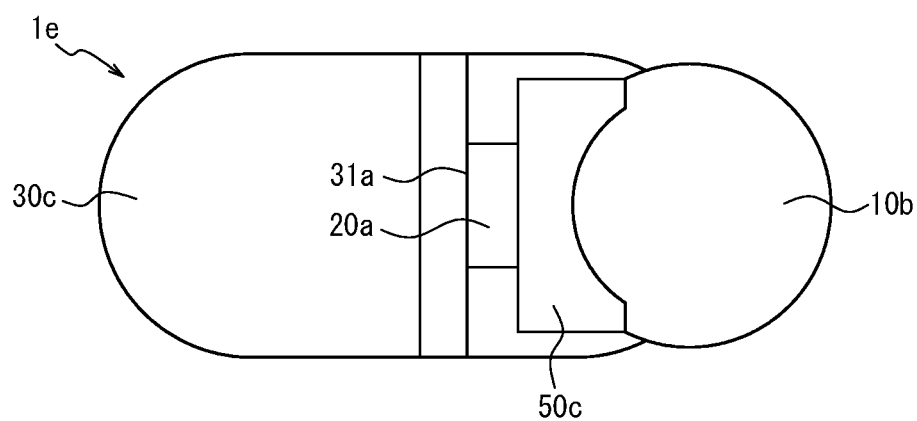

Alternatively, in placed of photoelectric conversion device 1d, as shown in FIG. 5B, it is possible to use photoelectric conversion device 1e that comprises main body 30c having covers whose shape is made semi-circular in part so as to conform to the shape of photoelectric conversion module 10b, and rectangular reinforcing member 50c having a lacking part so as to conform to the outer edge of photoelectric conversion module 10b. Also in the case of photoelectric conversion device 1e, the covers of main body 30c are closed with photoelectric conversion module 10b attached, so that photoelectric conversion module 10b, first connection member 20a and reinforcing member 50c can be sandwiched with the covers of main body 50c to protect them from external impact. Furthermore, as reinforcing member 50c has a rectangular shape with a lacking part, the stress on photoelectric conversion module 10b upon attachment/detachment of photoelectric conversion module 10b to/from main body 30c is dispersed, so that damage to photoelectric conversion module 10b can be limited.

As Modified Example 2 of photoelectric conversion device 1a, as shown in FIGS. 6A and 6B, photoelectric conversion device 1a can be photoelectric conversion device 1f which comprises photoelectric conversion module group 70 including photoelectric conversion module 10a, wherein photoelectric conversion module group 70 is foldable with adjacent photoelectric conversion modules stacked on top of each other, and reinforcing member 50d has a thickness in vertical direction that is greater than or equal to the thickness in vertical direction of photoelectric conversion module group 70 in folded form. Photoelectric conversion module group 70 comprises, in addition to photoelectric conversion module 10a, first module group coupling section 71, first additional photoelectric conversion module 72, second module group coupling section 73, and second additional photoelectric conversion module 74. First and second additional photoelectric conversion modules 72, 74 are in the form of a thin panel as with photoelectric conversion module 10a and each comprise solar panel 11 for power generation. First and second module group coupling sections 71, 73 are for coupling adjacent photoelectric conversion modules and are made of, for example, flexible, electrically conductive material. The electric power generated by first and second additional photoelectric conversion modules 72, 74 is supplied via these coupling sections to first connection member 20b. Note that the number of the additional photoelectric conversion modules is not limited to two; one or three or more such additional photoelectric conversion modules may be provided.

When reinforcing member 50d of photoelectric conversion device 1f has a thickness in vertical direction that is greater than or equal to the thickness in vertical direction of photoelectric conversion module group 70 in folded form as described above, it is possible to achieve proper protection of photoelectric conversion module group 70 when it is housed in folded form.

As shown in FIG. 6A, in photoelectric conversion module group 70 of photoelectric conversion device 1f, photoelectric conversion module 10a has a width that is greater than the width of any one of other photoelectric conversion modules 72, 74 by the amount W1, as measured in a direction in which the photoelectric conversion modules are coupled. It is preferred that the relation $W1 \geq W2 \times \frac{1}{2}$ holds when, as shown in FIG. 6B, the distance between adjacent photoelectric conversion modules is defined as W2. With such a configuration, when photoelectric conversion module group 70 is folded as shown in FIG. 6A, it is possible to prevent the bent second module group coupling section 73 from contacting reinforcing member 50d.

Figure 7A:
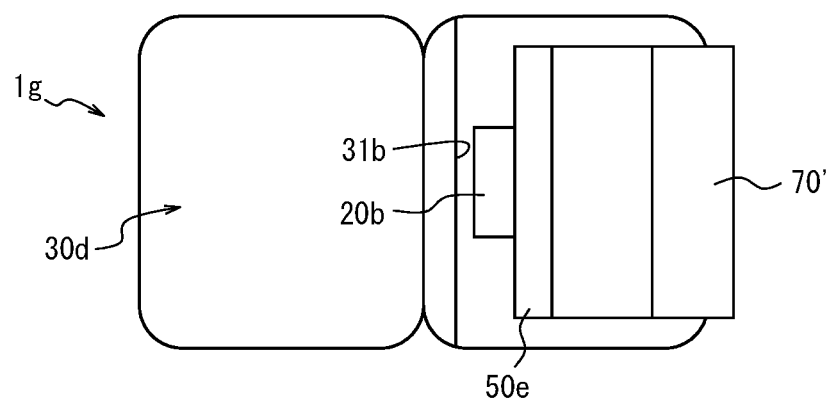
FIGS. 7A and 7B are a top view and a cross-sectional view, respectively, of Modified Example 3 of the photoelectric conversion device shown in FIG. 1.
Figure 7B:
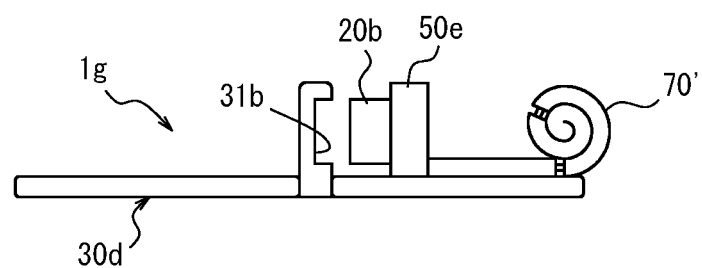

As Modified Example 3 of photoelectric conversion device 1a, as shown in FIG. 7A, photoelectric conversion device 1a can be photoelectric conversion device 1g wherein photoelectric conversion module 10a is included in flexible photoelectric conversion module group 70' which can be housed in rolled form. At this time, as shown in FIG. 7B, when reinforcing member 50e of photoelectric conversion module 1g has a thickness in vertical direction that is greater than or equal to the thickness in vertical direction of the rolled photoelectric conversion module group 70', it is possible to achieve proper protection of photoelectric conversion module group 70' when it is housed in rolled form. Note that a single flexible photoelectric conversion module (not shown) may be provided in place of photoelectric conversion module group 70' and a reinforcing member (not shown) may have a thickness in vertical direction that is greater than or equal to the thickness in vertical direction of the rolled flexible photoelectric conversion module. A similar effect can be obtained also in this case.

Figure 8:
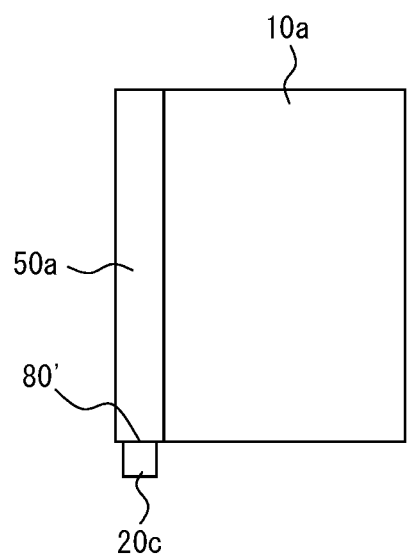
FIG. 8 is a top view of Modified Example 4 of the photoelectric conversion device shown in FIG. 1.

As Modified Example 4 of photoelectric conversion device 1a, as shown in FIG. 8, photoelectric conversion device 1a can be a photoelectric conversion device wherein, in place of first connection member 20a, first connection 20c is used which is provided on a side surface of reinforcing member 50a that runs in a direction perpendicular to the direction in which reinforcing member 50a couples to photoelectric conversion module 10a and to vertical direction, and wherein a main body (not shown) having a main body connection section (not shown) attachable/detachable to/from first connection member 20c is used in place of main body 30a. Also in this case, as in the case of first connection member 20a, first connection member 20c has a thickness in vertical direction that is greater than the thickness in vertical direction of photoelectric conversion module 10a and less than or equal to the thickness in vertical direction of reinforcing member 50a at joint 80'. This configuration makes it difficult for stress to be conducted to photoelectric conversion module 10 upon attachment/detachment of first connection member 20c to/from the main body. Such first connection member 20c and the main body are applicable to all the photoelectric conversion devices described above.

Figure 9:
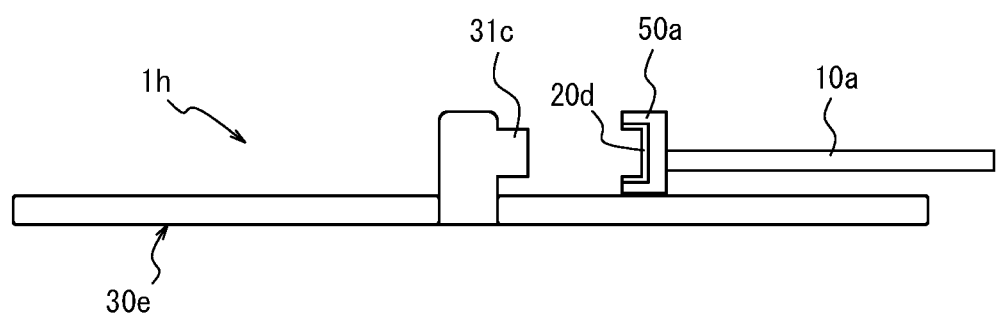
FIG. 9 is a cross-sectional view of Modified Example 5 of the photoelectric conversion device shown in FIG. 1.

As Modified Example 5 of photoelectric conversion device 1a, as shown in FIG. 9, in place of first connection member 20a, female first connection member 20d can be used, and in place of main body connection section 31a, male main body connection section 31c can be used that can receive first connection member 20d. Note that first connection member 20d can be incorporated into reinforcing member 50a. With this configuration, first connection member 20d does not protrude while photoelectric conversion module 10a is detached from the main body, providing large space for housing. Such a female first connection member is applicable to all the photoelectric conversion modules described above as a matter of course.

Note that first connection members 20b to 20d may also comprise a locking mechanism that ensures that the connection member is mechanically kept secured to a connection target. Further, the properties of the components of the photoelectric conversion devices described in various modified examples are similar to those for photoelectric conversion device 1a except for those specifically described above.

The foregoing description merely illustrates one embodiment of this disclosure and it goes without saying that various modifications may be made in the claims.

INDUSTRIAL APPLICABILITY

According to this disclosure, it is possible to provide a photoelectric conversion device wherein a connection member can be reliably coupled to a thin panel-shaped photoelectric conversion module.

REFERENCE SIGNS LIST 1a, 1b, 1c, 1d, 1e, 1f, 1g, 1h photoelectric conversion device
10a, 10b photoelectric conversion module
11 solar panel
12 lead-out wire
20a, 20b, 20c, 20d first connection member
21 main body interface
30a, 30b, 30c, 30d, 30e main body
31a, 31b, 31c main body connection section
311 photoelectric conversion module interface
32 step-up circuit section
33 photoelectric conversion module voltage detection section
34 AC adapter voltage detection section
35 rechargeable battery
36 external interface (second connection member)
37 charge/discharge control circuit
38 controller
40 AC adapter
41 outlet
42 AC/DC converter
50a, 50b, 50c, 50d, 50e reinforcing member
60a, 60b third connection member
70 photoelectric conversion module group
71 first module group coupling section
72 first additional photoelectric
73 conversion module
second module group coupling section
74 second additional photoelectric conversion module
80 joint

The invention claimed is:

1. A photoelectric conversion device, comprising:
a thin panel-shaped photoelectric conversion module;
a first connection member that couples to an outer edge of the photoelectric conversion module at a joint and is electrically connected to the photoelectric conversion module;
a reinforcing member that couples to a portion including the joint; and
a main body that is electrically connected to the photoelectric conversion module via the first connection member,
wherein the thin panel-shaped photoelectric conversion module has a rectangular shape as viewed in vertical direction, and has a thickness that is more than or equal to 10 μm and less than or equal to 3 mm,
wherein the reinforcing member is rigid and provided to cover the joint,
wherein the reinforcing member physically reinforces the first connection member and the photoelectric conversion module,
wherein the main body comprises a main body connection section,
wherein the first connection member is mechanically and electrically connected to the main body via the main body connection section of the main body and has a thickness in vertical direction that is greater than a thickness in vertical direction of the photoelectric conversion module and less than a thickness in vertical direction of the reinforcing member at the joint,
wherein a width of the first connection member is less than a width of the reinforcing member, as measured in a direction perpendicular to a direction in which the photoelectric conversion module is coupled to the main body, and
wherein the first connection member is a card edge connector having a part embedded in the reinforcing member and another part exposed from the reinforcing member and detachably attached to the main body connection section.

2. The photoelectric conversion device according to claim 1, wherein the photoelectric conversion module can be housed in rolled form, and
the reinforcing member has a thickness in vertical direction that is greater than or equal to a thickness in vertical direction of the photoelectric conversion module in rolled form.

3. The photoelectric conversion device according to claim 1, wherein the photoelectric conversion module is included in a photoelectric conversion module group in which a plurality of thin panel-shaped photoelectric conversion modules are coupled to one another,
the photoelectric conversion module group is foldable in vertical direction with adjacent photoelectric conversion modules being stacked on top of each other, and
the reinforcing member has a thickness in vertical direction that is greater than or equal to a thickness in vertical direction of the photoelectric conversion module group in folded form.

4. The photoelectric conversion device according to claim 3, wherein in the photoelectric conversion module group, the photoelectric conversion module that couples to the first connection member has a width that is greater than a width of any one of other photoelectric conversion modules by at least half a distance between adjacent photoelectric conversion modules, as measured in a direction in which the photoelectric conversion modules are coupled.

5. The photoelectric conversion device according to claim 1, wherein the photoelectric conversion module is included in a photoelectric conversion module group in which a plurality of thin panel-shaped photoelectric conversion modules are coupled to one another,
the photoelectric conversion module group can be housed in rolled form, and
the reinforcing member has a thickness in vertical direction that is greater than or equal to a thickness in vertical direction of the photoelectric conversion module group in rolled form.

6. The photoelectric conversion device according to claim 1, wherein the main body comprises a second connection member capable of supplying electric power to an external device, and
wherein the second connection member is a USB connector or a cable having a connector at a tip thereof.

7. The photoelectric conversion device according to claim 1, wherein the first connection member has a connection mechanism composed of a guide and a connector.

8. The photoelectric conversion device according to claim 1, further comprising a third connection member provided on the reinforcing member or the main body, the third connection member being capable of mechanically attaching/detaching the reinforcing member or the photoelectric conversion module to/from the main body.

9. The photoelectric conversion device according to claim 1, wherein the reinforcing member contacts with at least a part of side faces of the joint, the side faces facing the direction perpendicular to the direction in which the photoelectric conversion module is coupled to the main body.

10. The photoelectric conversion device according to claim 9, wherein the reinforcing member contacts with each of the side faces.

11. The photoelectric conversion device according to claim 1, wherein a part of the first connection member is embedded in the reinforcing member and another part of the first connection member is exposed from the reinforcing member.

* * * * *